(12) United States Patent
Dektyarev et al.

(10) Patent No.: US 12,306,886 B2
(45) Date of Patent: May 20, 2025

(54) METHOD AND A SERVER FOR GENERATING A MACHINE LEARNING MODEL

(71) Applicant: Yandex Music LLC, Moscow (RU)

(72) Inventors: Mikhail Dektyarev, Vladimir (RU); Alexander Safronov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/218,395

(22) Filed: Jul. 5, 2023

(65) Prior Publication Data

US 2024/0012861 A1    Jan. 11, 2024

(30) Foreign Application Priority Data

Jul. 5, 2022    (RU) ................ 2022118288

(51) Int. Cl.
 *G06F 16/9535*    (2019.01)
(52) U.S. Cl.
 CPC ................ *G06F 16/9535* (2019.01)
(58) Field of Classification Search
 CPC ................ G06F 16/9535
 See application file for complete search history.

(56) References Cited

U.S. PATENT DOCUMENTS

| | | | |
|---|---|---|---|
| 8,843,484 B2 | 9/2014 | Gu et al. | |
| 2013/0226856 A1* | 8/2013 | Zhang | G06N 7/01 706/52 |
| 2016/0125501 A1* | 5/2016 | Nemery | G06F 16/24578 705/26.7 |
| 2016/0328409 A1 | 11/2016 | Ogle et al. | |

(Continued)

FOREIGN PATENT DOCUMENTS

| | | |
|---|---|---|
| CN | 110362711 A | 10/2019 |
| CN | 111506908 A | 8/2020 |

(Continued)

OTHER PUBLICATIONS

Rubtsov et al., "A hybrid two-stage recommender system for automatic playlist continuation", Published on Oct. 2, 2018, Article No. 18, pp. 1-4, https://doi.org/10.1145/3267471.3267488.

(Continued)

*Primary Examiner* — Courtney Harmon
(74) *Attorney, Agent, or Firm* — BCF LLP

(57) ABSTRACT

Method and server for generating a machine learning model are disclosed. The method includes receiving user-item interaction data indicative of previous interactions between the plurality of users and a plurality of digital items, and generating, based on the user-item interaction data, the machine learning model for predicting scores indicative of a likelihood that a given user of the plurality of users will interact with a given digital item of the plurality of digital items. The model includes a plurality of item-specific decision-tree (ISDT) sub-models. A given one from the given plurality of DTs of a given ISDT sub-model having feature nodes and leaf nodes. The feature nodes correspond to the respective training features and the leaf nodes associated with output values of the given one from the given plurality of DTs.

10 Claims, 6 Drawing Sheets

(56) References Cited

U.S. PATENT DOCUMENTS

| | | | |
|---|---|---|---|
| 2017/0061286 | A1 | 3/2017 | Kumar et al. |
| 2017/0083625 | A1 | 3/2017 | Gusev et al. |
| 2019/0050750 | A1 | 2/2019 | Le et al. |
| 2021/0125098 | A1 | 4/2021 | Peran et al. |
| 2021/0233148 | A1 | 7/2021 | Govindan et al. |
| 2021/0287273 | A1* | 9/2021 | Janakiraman ...... G06Q 30/0623 |
| 2021/0350181 | A1 | 11/2021 | Navratil et al. |
| 2021/0350307 | A1 | 11/2021 | Price et al. |
| 2021/0374616 | A1 | 12/2021 | Price et al. |
| 2022/0067088 | A1* | 3/2022 | Aryan .................. G06F 16/636 |
| 2022/0083614 | A1 | 3/2022 | Ushanov et al. |
| 2024/0169003 | A1* | 5/2024 | Grappin .............. G06F 16/9538 |
| 2024/0241914 | A1* | 7/2024 | Tikku .................. G06F 16/9535 |

FOREIGN PATENT DOCUMENTS

| | | |
|---|---|---|
| CN | 111708949 A | 9/2020 |
| CN | 112085525 A | 12/2020 |
| CN | 113076484 A | 7/2021 |
| CN | 113706258 A | 11/2021 |
| EP | 3293646 A1 | 3/2018 |
| RU | 2632100 C2 | 10/2017 |
| RU | 2632132 C1 | 10/2017 |
| RU | 2714594 C1 | 2/2020 |
| RU | 2725659 C2 | 7/2020 |
| RU | 2731659 C2 | 9/2020 |

OTHER PUBLICATIONS

Tian et al., "A Music Recommendation System Based on logistic regression and extreme Gradient Boosting", Published on Jul. 1, 2019, International Joint Conference on Neural Networks (IJCNN), Date of Conference Jul. 14-19, 2019, DOI: 10.1109/IJCNN.2019.8852094.

Du et al.,"Integrating KNN and Gradient Boosting Decision Tree for Recommendation", Published in 2021, IEEE 5th Advanced Information Technology, Electronic and Automation Control Conference (IAEAC), Date of Conference Mar. 12-14, 2021, DOI: 10.1109/IAEAC50856.2021.9390647.

Lu et al.,"A Hybrid Collaborative Filtering Algorithm Based on KNN and Gradient Boosting", Published in 2018, 13th International Conference on Computer Science & Education (ICCSE), Date of Conference Aug. 8-11, 2018, DOI: 10.1109/ICCSE.2018.8468751.

Rawat et al.,"Advancement of recommender system based on clickstream data using gradient boosting and random forest classifiers", Published in 2017, 8th International Conference on Computing, Communication and Networking Technologies (ICCCNT), Date of Conference: Jul. 3-5, 2017, DOI: 10.1109/ICCCNT.2017.8204029.

Russian Search Report dated Apr. 18, 2024 issued in respect of the counterpart Russian Patent Application No. RU 2022118288.

* cited by examiner

METHOD AND A SERVER FOR GENERATING A MACHINE LEARNING MODEL

CROSS-REFERENCE

The present application claims priority to Russian Patent Application No. 2022118288, entitled "Method and a Server for Generating a Machine Learning Model", filed Jul. 5, 2022, the entirety of which is incorporated herein by reference.

FIELD

The present technology relates to computer-implemented recommendation systems in general, and specifically, to a method and a server for generating a machine learning model.

BACKGROUND

Various global or local communication networks (the Internet, the World Wide Web, local area networks, and the like) offer a user a vast amount of information. The information includes a multitude of contextual topics, such as but not limited to, news and current affairs, maps, company information, financial information and resources, traffic information, games, and entertainment-related information. Users use a variety of client devices (desktop, laptop, notebook, smartphone, tablets, and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain the information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on the explicit or implicit interests of the user.

An example of such a system is a Flipboard™ recommendation system, which system aggregates and recommends content from various sources, where the user can "flip" through the pages with the recommended/aggregated content. The recommendation system collects content from social media and other web sites, presents it in magazine format, and allows users to "flip" through their social-networking feeds and feeds from web sites that have partnered with the company, effectively "recommending" content to the user even though the user may not have expressly expressed her/his desire in the particular content.

Another example of the recommendation system is Yandex.Zen™, which recommends digital content such as articles, news, and video in a personalized feed on the Yandex.Browser™ start screen. As the user browses the Yandex.Zen™ recommended content, a server acquires explicit (by asking whether the user likes to see more of such content in the user's feed) or implicit (by observing user content interactions) feedback. Using this feedback, the server continuously improves the content recommendations presented to the given user. Different computer-implemented techniques can be employed for improving content recommendations.

Some techniques are referred to as "content-based approaches", these techniques extract genre, semantic features, labels, tags and audio features from songs, for example, user listened to and recommend the most similar songs to the user's favorites. However, these approaches heavily depend on music metadata quality and feature selection. Such approaches can include linear and neural-based techniques.

Other techniques are referred to as "collaborative filtering approaches", these other techniques use curated item data to filter out items that a user might like on the basis of reactions by similar users. For example, a neighborhood-based approach is popular in the industry for its speed and simplicity, although Singular Value Decomposition (SVD) models tend to show better performance. However, collaborative approaches have several drawbacks. Firstly, an item with no ratings cannot be recommended, which is known as the cold-start problem. Secondly, the music tracks' distribution is highly biased towards popular ones, while many tracks may lack collaborative information.

CN 110362711 relates to methods where collaborative filtering is used on songs of a music recommendation systems, and where decision tree models are contemplated.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developers of the present technology have realized that a variety of machine learning models may be used for performing digital item recommendation to users of a recommendation system. For example, Singular Value Decomposition (SVD) models, Sparse Linear Method (SLIM) models, Deep Semantic Similarity Model (DSSM) models, and transformer models can be used for generating a prediction as to whether a given user of the recommendation service is likely to interact with a given digital item of the recommendation service. These models can be broadly categorized into two types of models—that is, matrix decomposition models and neural models.

Developers of the present technology have devised a machine learning model based on Decision Trees (DTs) for generating predictions as to whether a given user of the recommendation service is likely to interact with a given digital item of the recommendation service. Broadly, DT learning is a predictive modelling approach used in statistics, data mining and machine learning. It uses a tree-structured predictive model to go from observations about an object (represented in the branches) to conclusions about the object's target value (represented in the leaves). DTs where the target variable can take a discrete set of values are called "classification trees" in which leaves represent class labels and branches represent conjunctions of features that lead to those class labels. DTs where the target variable can take continuous values (typically real numbers) are called "regression trees".

In some embodiments of the present technology, there is provided a DT model that has been generated using a "Gradient Boosting" technique.

Gradient Boosting and Decision Trees

Gradient boosting (GB) is a machine-learning method that can be used on tasks containing heterogeneous features, complex dependencies, and noisy data, such as in applications related to web search, recommendation systems, weather forecasting, and many others. Broadly speaking, GB iteratively combines weak models to obtain more accurate ones. A DT model trained based on GB techniques may be referred to as a GBDT model.

GBDT models are used in libraries such as XGBoost, LightGBM, and CatBoost. It should be noted that the CatBoost library and additional information regarding gradient boosting algorithms is available at https://catboost.ai. It is contemplated that at least some embodiments of the present technology can be implemented in accordance with the CatBoost framework.

Broadly speaking, the GB method allows to iteratively combine weak models, such as DTs, to obtain more accurate predictions. It can be formulated that, given a dataset D and a loss function $L: \mathbb{R}^2 \to \mathbb{R}$, the GB algorithm iteratively constructs a GBDT model $F: X \to \mathbb{R}$ to minimize the empirical risk $L(F|D) = E_D[L(F(x), y)]$. At each iteration t the model is updated as:

$$F^{(t)}(x) = F^{(t-1)}(x) + \varepsilon h^{(t)}(x) \qquad (1)$$

where $F^{(t-1)}$ is a model constructed at the previous iteration, $h^{(t)}(x) \in H$ is a weak learner chosen from some family of functions H, and £ is learning rate. The weak learner $h^{(t)}$ can be chosen to approximate the negative gradient $$-g^{(t)}(x, y) := -\frac{\partial L(y, s)}{\partial s}\bigg|_{s=F^{(t-1)}(x)} : h^{(t)} = \qquad (2)$$
$$\operatorname*{argmin}_{h \in H} \mathbb{E}_D\!\left[\left(-g^{(t)}(x, y) - h(x)\right)^2\right]$$

A weak learner $h^{(t)}$ is associated with parameters $\varphi^{(t)} \in \mathbb{R}^d$ and the formulation $h^{(t)}(x, \varphi^{(t)})$ is made to reflect this association. The set of weak learners H can consists of shallow DTs, which are models that recursively partition the feature space into disjoint regions called leaves. Each leaf $R_j$ of the tree is assigned to a value, which is the estimated response y in the corresponding region. It can be formulated that $h^{(t)}(x, \varphi^{(t)}) = \Sigma_{j=1}^d \varphi_j^{(t)} 1_{\{x \in R_j\}}$, so the DT is a linear function of $\varphi^{(t)}$. Therefore, it can be said that the "final" GBDT model F can be, in some embodiments, a combination of DTs and the parameters of the full model are denoted by θ.

In some embodiments of the present technology, developers have devised methods and servers for generating DT models based on user-item interaction data. These DT models can be trained, and used, independently from one another to generate scores for respective, specific digital items. These models can be referred to as "item-specific" DT (ISDT) models, meaning that a given ISDT model is trained, and used, for predicting the score of a corresponding (specific) digital item of the recommendation system.

Non-Limiting Implementation of an ISDT Model

With reference to FIG. 2, there is depicted a user-item interaction matrix 200 between a plurality of digital items 210 and a plurality of users 220. For example, such a user-item interaction matrix 200 can be used to recommend digital items using collaborative filtering (CF) approaches. The dimension of the user-item interaction matrix 200 is equal to a number of users in the plurality of users 220 per a number of digital items in the plurality of digital items 210.

In this non-limiting implementation, the digital items are songs, or "tracks", that are recommendable by a given music recommendation system. The user-item interaction matrix 200 includes information indicative of user-item interactions 230 for respective user-item pairs. In this non-limiting implementation, the user-item interactions 230 are indicative of "likes" (with a value of "1") of users of respective user-item pairs, or an absence thereof for a respective user-item pair (with a value of "0").

During the training process of the ISDT model, data from the user-interaction matrix 200 is used for generating a training set 250 for that given ISDT model. In this non-limiting implementation, the training set 250 is being generated for a third digital item "Track[3]" from the plurality of digital items 210.

The training set 250 comprises a training target set 260, and a training input set 270. For this ISDT model, user-item interaction data 240 for the third digital item is used for generating the training target set 260. The user-item interaction data 240 is indicative of user-item interactions between the plurality of users 220 and the third digital item. For this ISDT model, the remainder of the user-item interaction data 230 (all except the user-item interaction data 240) is used for generation the training input set 270. The user-item interaction data 230 except the user-item interaction data 240 is indicative of user-item interactions between the plurality of users 220 and a subset of digital items. In this non-limiting implementation, the subset of digital items includes all digital items from the plurality of digital items 210, except for the third digital item.

Developers of the present technology have realized that the subset of digital items can be used as "training features" for training an ISDT model, user-item interaction data between the subset of digital items and the plurality of users can be used as "training input values" for the training features, and user-item interaction data between the third digital item and the plurality of users can be used as "training target values" for the training features. In this non-limiting implementation, a number of training features in the training input set 270 can be equal to a number of digital items in the subset of digital items (number of digital items in the plurality of digital items 210 minus one).

It is contemplated that the training set 250 may be used to train a GBDT model. In one implementation, the training set 250 can be used to train a GBRT model, and standard error can be used as a loss. A first DT can thus be generated and has feature nodes and leaf nodes. The feature nodes of the DT represent the respective training features of the training set 250 (i.e., respective ones from the subset of digital items), and average values of the error gradient can be located in the leaf nodes of the DT. After so-generating the first DT, the gradient can be updated and the process continues with generation of a next DT of the ISDT model, and so forth. As a result, a plurality of DTs forming the ISDT model are generated.

In this non-limiting implementation, during in-use, this ISDT model can receive as input a list of digital items liked by a current user, and can return as output an estimate of the probability that this user will also like the third digital item.

It is contemplated, that the user-item interaction matrix 200 may be used for generating a large number of ISDT models. In this non-limiting implementation, the user-item interaction matrix 200 may be used to generate a number of ISDT models that is equal to a number of digital items in the plurality of digital items 210.

Similarly to what has been described above with respect to the ISDT model for the third digital item, an other training set may be generated for an other digital item where user-interaction data for that other digital item is used as an other training target set, and an other subset of digital items (excluding the other digital item) are used as other training features. Put another way, the training set generation process can be repeated by selecting different columns of the user-item interaction matrix 200, thereby selecting corresponding digital items as respective target digital items for respective ISDT models and train them independently on the respective sets of digital items (excluding respective target digital items).

Developers of the present technology have realized that since a large number of training features of a same type (represented by digital items) are used, the tree building process can be split into parallel pipelines. These parallel pipelines can be executed via low-level CPU optimization. Additionally, or alternatively, these parallel pipelines can be executed on a GPU. In some embodiments, since the ISDT models are trained independently from one another, the training datasets may be transmitted to respective hardware machines for performing the training processes in parallel, thereby allowing for better scaling.

In a first broad aspect of the present technology, there is provided a method of generating a machine learning model, the machine learning model to be used for generating a digital item recommendation to a user of a recommendation system, the user being one of a plurality of users, the recommendation system being executed by a server, the user being associated with an electronic device, the electronic device being communicatively connectable with the server over a communication network, the method executable by the server. The method comprises receiving user-item interaction data indicative of previous interactions between the plurality of users and a plurality of digital items available for recommendation to the plurality of users within the recommendation system. The method comprises generating based on the user-item interaction data, the machine learning model for predicting scores indicative of a likelihood that a given user of the plurality of users will interact with a given digital item of the plurality of digital items. The machine learning model includes a plurality of item-specific decision-tree (ISDT) sub-models, a given ISDT sub-model of the plurality of ISDT sub-models being associated with the given digital item for generating a score indicative of the likelihood that the given user will interact with the given digital item. The generating including generating for the given ISDT sub-model a training set.

The training set includes a training target set for the given digital item containing the user-item interaction data associated with the given digital item, and a training input set for the given digital item containing the user-item interaction data associated with a subset of digital items of the plurality of digital items, the subset of digital items excluding the given digital item. The subset of digital items is to be used as training features for generating the given ISDT sub-model such that previous user-item interactions between the plurality of users and the subset of digital items are used as values for respective training features. The generating including generating a given plurality of decision trees (DTs) using the training set, the given plurality of DTs forming the given ISDT sub-model. A given one from the given plurality of DTs has feature nodes and leaf nodes, the feature nodes corresponding to the respective training features and the leaf nodes associated with output values of the given one from the given plurality of DTs.

In some embodiments of the method, the generating the machine learning model further includes, generating for a second ISDT sub-model a second training set including: a second training target set for a second digital item from the plurality of digital items containing the user-item interaction data associated with the second digital item, and a second training input set for the second digital item containing the user-item interaction data associated with a second subset of digital items of the plurality of digital items, the subset of digital items excluding the second digital item and including the given digital item. The second subset of digital items to be used as second training features for generating the second ISDT sub-model such that previous user-item interactions between the plurality of users and the second subset of digital items are used as values for respective second training features. The generating including generating a second plurality of decision trees (DTs) using the second training set, the second plurality of DTs forming the second ISDT sub-model. A given one from the second plurality of DTs has second feature nodes and second leaf nodes, the second feature nodes corresponding to the respective second training features and the second leaf nodes associated with output values of the given one from the second plurality of DTs.

In some embodiments of the method, the method further comprises: receiving a request for content recommendation from the electronic device associated with the user of the recommendation system; generating employing an other machine learning algorithm, a preliminary set of digital items from the plurality of digital items to be potentially recommended to the user, the preliminary set of digital items including the given digital item and the second digital item; generating employing the machine learning algorithm, the score for the given digital item using the given ISDT sub-model and a second score for the second digital item using the second ISDT sub-model; ranking the given digital item and the second digital item amongst the preliminary set of digital items using the score and the second score; and transmitting a response for content recommendation to the electronic device including at least one amongst the given digital item and the second digital item.

In some embodiments of the method, the plurality of digital items include music digital items.

In some embodiments of the method, the plurality digital items include video digital items.

In some embodiments of the method, the subset of digital items includes all digital items from the plurality of digital items except the given digital item.

In a second broad aspect of the present technology, there is provided a method of generating an item-specific decision-tree (ISDT) model, the ISDT model being associated with a given digital item from a plurality of digital items available for recommendation to a plurality of users within a recommendation system, the ISDT model for generating a score indicative of the likelihood that a given user from the plurality of users will interact with the given digital item, the recommendation system executed by a server, the method executable by the server. The method comprises receiving user-item interaction data indicative of previous interactions between the plurality of users and the plurality of digital items. The method comprises generating a training set including: a training target set for the given digital item containing the user-item interaction data associated with the given digital item, and a training input set for the given digital item containing the user-item interaction data associated with a subset of digital items of the plurality of digital items, the subset of digital items excluding the given digital item. The subset of digital items to be used as training features for generating the ISDT model such that previous user-item interactions between the plurality of users and the subset of digital items are used as values for respective training features. The generating including generating a plurality of decision trees (DTs) using the training set, the plurality of DTs forming the ISDT model. A given one from the plurality of DTs has feature nodes and leaf nodes, the feature nodes corresponding to the respective training features and the leaf nodes associated with output values of the given one from the plurality of DTs.

In some embodiments of the method, the generating the plurality of DTs includes executing a Gradient Boosting (GB) algorithm.

In some embodiments of the method, the plurality of digital items includes at least one of music digital items and video digital items.

In a third broad aspect of the present technology, there is provided a method of generating a digital item recommendation to a user of a recommendation system, the recommendation system being executed by a server, the user being associated with an electronic device, the electronic device being communicatively connectable with the server over a communication network, the method executable by the server. The method comprises receiving a request for content recommendation from the electronic device, the user being associated with user-item interaction data indicative of previous user-item interactions between the user and a plurality of digital items available for recommendation in the recommendation system. The method comprises generating executing an item-specific decision-tree (ISDT) model, a score for a user-item pair including the user and a given digital item, the ISDT model being associated with the given digital item, the score being indicative of the likelihood that the user will interact with the given digital item. The ISDT model includes a plurality of decision-trees (DTs), a given one from the plurality of DTs having feature nodes and leaf nodes, the feature nodes corresponding to respective features and the leaf nodes associated with output values of the given one from the given plurality of DTs. The respective features are represented by a subset of digital items from the plurality of digital items, the subset of digital items excluding the given digital item. The generating includes: generating in-use output values by respective ones from the plurality of DTs using previous user-item interactions between the user and the subset of digital items as values for the respective features, and generating the score by combining the in-use output values. The method comprises ranking the given digital item amongst the plurality of digital items using the score. The method comprises transmitting a response for content recommendation to the electronic device including the given digital item.

In a fourth broad aspect of the present technology, there is provided a server for generating a machine learning model, the machine learning model to be used for generating a digital item recommendation to a user of a recommendation system, the user being one of a plurality of users, the recommendation system being executed by the server, the user being associated with an electronic device, the electronic device being communicatively connectable with the server over a communication network. The server is configured to receive user-item interaction data indicative of previous interactions between the plurality of users and a plurality of digital items available for recommendation to the plurality of users within the recommendation system. The server is configured to generate, based on the user-item interaction data, the machine learning model for predicting scores indicative of a likelihood that a given user of the plurality of users will interact with a given digital item of the plurality of digital items. The machine learning model includes a plurality of item-specific decision-tree (ISDT) sub-models, a given ISDT sub-model of the plurality of ISDT sub-models being associated with the given digital item for generating a score indicative of the likelihood that the given user will interact with the given digital item. The server configured to generate comprises the server configured to generate for the given ISDT sub-model a training set including: (i) a training target set for the given digital item containing the user-item interaction data associated with the given digital item, (ii) a training input set for the given digital item containing the user-item interaction data associated with a subset of digital items of the plurality of digital items, the subset of digital items excluding the given digital item. The subset of digital items is to be used as training features for generating the given ISDT sub-model such that previous user-item interactions between the plurality of users and the subset of digital items are used as values for respective training features. The server configured to generate comprises the server configured to generate a given plurality of decision trees (DTs) using the training set, the given plurality of DTs forming the given ISDT sub-model. A given one from the given plurality of DTs has feature nodes and leaf nodes, the feature nodes corresponding to the respective training features and the leaf nodes associated with output values of the given one from the given plurality of DTs.

In some embodiments of the server, to generate the machine learning model further includes the server configured to: generate, for a second ISDT sub-model a second training set including: (i) a second training target set for a second digital item from the plurality of digital items containing the user-item interaction data associated with the second digital item, (ii) a second training input set for the second digital item containing the user-item interaction data associated with a second subset of digital items of the plurality of digital items, the subset of digital items excluding the second digital item and including the given digital item. The second subset of digital items is to be used as second training features for generating the second ISDT sub-model such that previous user-item interactions between the plurality of users and the second subset of digital items are used as values for respective second training features. To generate the machine learning model further includes the server configured to generate a second plurality of decision trees (DTs) using the second training set, the second plurality of DTs forming the second ISDT sub-model. A given one from the second plurality of DTs has second feature nodes and second leaf nodes, the second feature nodes corresponding to the respective second training features and the second leaf nodes associated with output values of the given one from the second plurality of DTs.

In some embodiments of the server, the server is further configured to: receive a request for content recommendation from the electronic device associated with the user of the recommendation system; generate, by employing an other machine learning algorithm, a preliminary set of digital items from the plurality of digital items to be potentially recommended to the user, the preliminary set of digital items including the given digital item and the second digital item; generate, by employing the machine learning algorithm, the score for the given digital item using the given ISDT sub-model and a second score for the second digital item using the second ISDT sub-model; rank the given digital item and the second digital item amongst the preliminary set of digital items using the score and the second score; and transmit a response for content recommendation to the electronic device including at least one amongst the given digital item and the second digital item.

In some embodiments of the server, the plurality of digital items include music digital items.

In some embodiments of the server, the plurality digital items include video digital items.

In some embodiments of the server, the subset of digital items includes all digital items from the plurality of digital items except the given digital item.

In a fifth broad aspect of the present technology, there is provided a server for generating an item-specific decision-tree (ISDT) model, the ISDT model being associated with a given digital item from a plurality of digital items available for recommendation to a plurality of users within a recommendation system, the ISDT model for generating a score indicative of the likelihood that a given user from the plurality of users will interact with the given digital item, the recommendation system executed by the server. The server is configured to receive user-item interaction data indicative of previous interactions between the plurality of users and the plurality of digital items. The server is configured to generate a training set including: (i) a training target set for the given digital item containing the user-item interaction data associated with the given digital item, and (ii) a training input set for the given digital item containing the user-item interaction data associated with a subset of digital items of the plurality of digital items, the subset of digital items excluding the given digital item. The subset of digital items to be used as training features for generating the ISDT model such that previous user-item interactions between the plurality of users and the subset of digital items are used as values for respective training features. The server is configured to generate a plurality of decision trees (DTs) using the training set, the plurality of DTs forming the ISDT model. A given one from the plurality of DTs has feature nodes and leaf nodes, the feature nodes corresponding to the respective training features and the leaf nodes associated with output values of the given one from the plurality of DTs.

In some embodiments of the server, the server configured to generate the plurality of DTs includes the server configured to execute a Gradient Boosting (GB) algorithm.

In some embodiments of the server, the plurality of digital items includes at least one of music digital items and video digital items.

In a sixth broad aspect of the present technology, there is provided a server for generating a digital item recommendation to a user of a recommendation system, the recommendation system being executed by the server, the user being associated with an electronic device, the electronic device being communicatively connectable with the server over a communication network. The server is configured to: receive a request for content recommendation from the electronic device, the user being associated with user-item interaction data indicative of previous user-item interactions between the user and a plurality of digital items available for recommendation in the recommendation system; generate, by executing an item-specific decision-tree (ISDT) model, a score for a user-item pair including the user and a given digital item, the ISDT model being associated with the given digital item, the score being indicative of the likelihood that the user will interact with the given digital item. The ISDT model includes a plurality of decision-trees (DTs), a given one from the plurality of DTs having feature nodes and leaf nodes, the feature nodes corresponding to respective features and the leaf nodes associated with output values of the given one from the given plurality of DTs. The respective features are represented by a subset of digital items from the plurality of digital items, the subset of digital items excluding the given digital item. The server configured to generate includes the server configured to generate in-use output values by respective ones from the plurality of DTs using previous user-item interactions between the user and the subset of digital items as values for the respective features, and generate the score by combining the in-use output values. The server is configured to rank the given digital item amongst the plurality of digital items using the score, and transmit a response for content recommendation to the electronic device including the given digital item.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
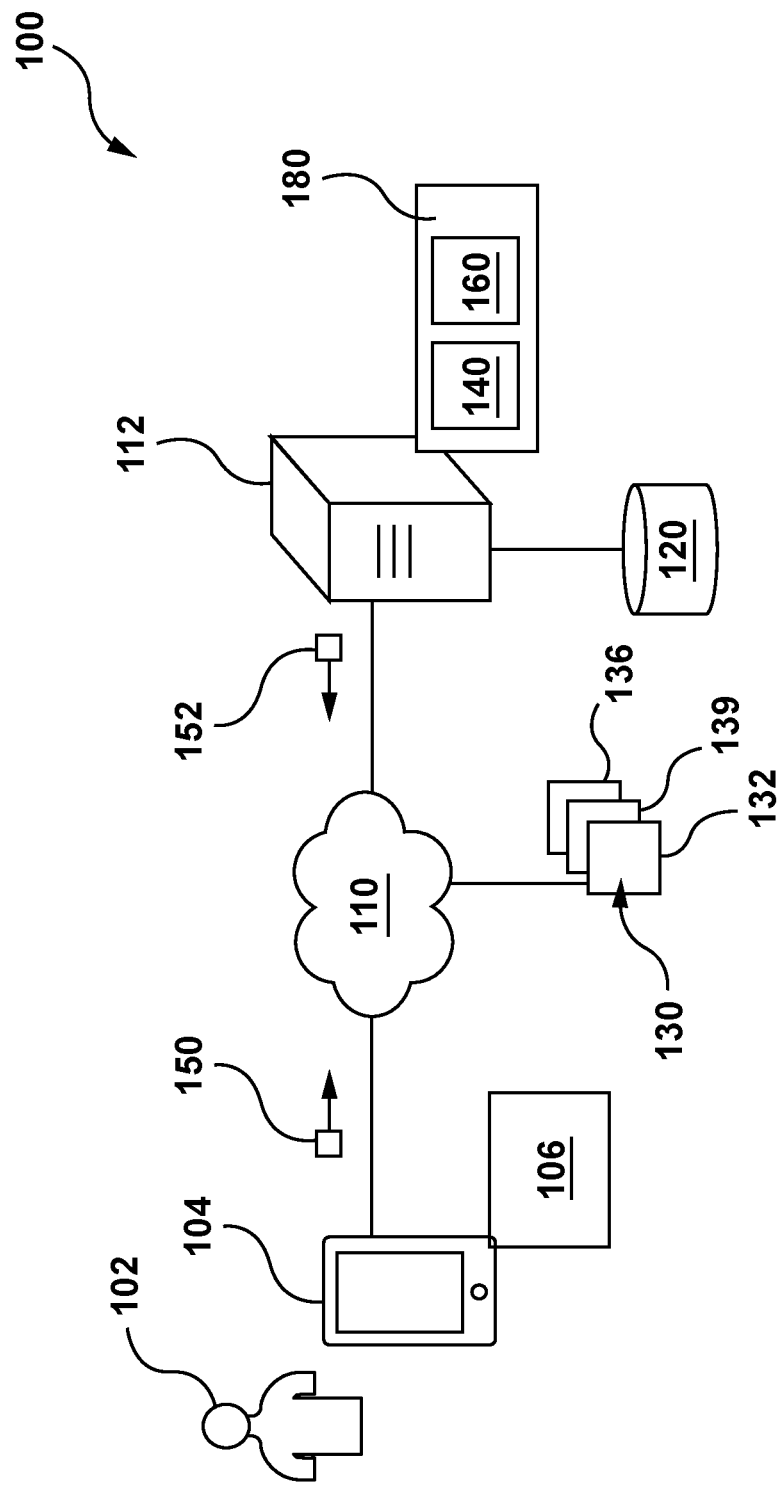
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether such computer or processor is explicitly shown.

The functions of the various elements shown in the figures, including any functional block labeled as a "processor" or a "graphics processing unit", may be provided using the dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case, they have been presented in this manner as an aid to understanding. As persons skilled in the art would understand, various implementations of the present technology may be of a greater complexity.

Generally speaking, the system 100 is configured to provide digital content recommendations to users of the system 100. For example, a user 102 (a given one of a plurality of users of the system 100) may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the system 100, as will be described in greater detail herein below.

Electronic Device

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

It should be noted that, although only the user 102 associated with the electronic device 104 is depicted in FIG. 1, it is contemplated that the user 102 associated with the electronic device 104 is a given user from the plurality of users of the system 100, and where each one of the plurality of users (not depicted) can be associated with a respective electronic device (not depicted).

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user 102 to receive (or otherwise access) digital content recommendations provided by the system 100, as will be described in greater detail herein below.

How the recommendation application 106 is implemented is not particularly limited. One example of the recommendation application 106 may include the user 102 accessing a web site associated with the recommendation service to access the recommendation application 106. For example, the recommendation application 106 may be accessed by typing in (or otherwise copy-pasting or selecting a link) an URL associated with the recommendation service. Alternatively, the recommendation application 106 may be an application downloaded from a so-called "app store", such as APPSTORE™ or GOOGLEPLAY™ and installed/executed on the electronic device 104. It should be expressly understood that the recommendation application 106 may be accessed using any other suitable means. In yet additional embodiments, the recommendation application 106 functionality may be incorporated into another application, such as a browser application (not depicted) or the like. For example, the recommendation application 106 may be executed as part of the browser application, for example, when the user 102 starts the browser application, the functionality of the recommendation application 106 may be executed.

Generally speaking, the recommendation application 106 comprises a recommendation interface (not depicted) being displayed on a screen of the electronic device 104.

Figure 6:
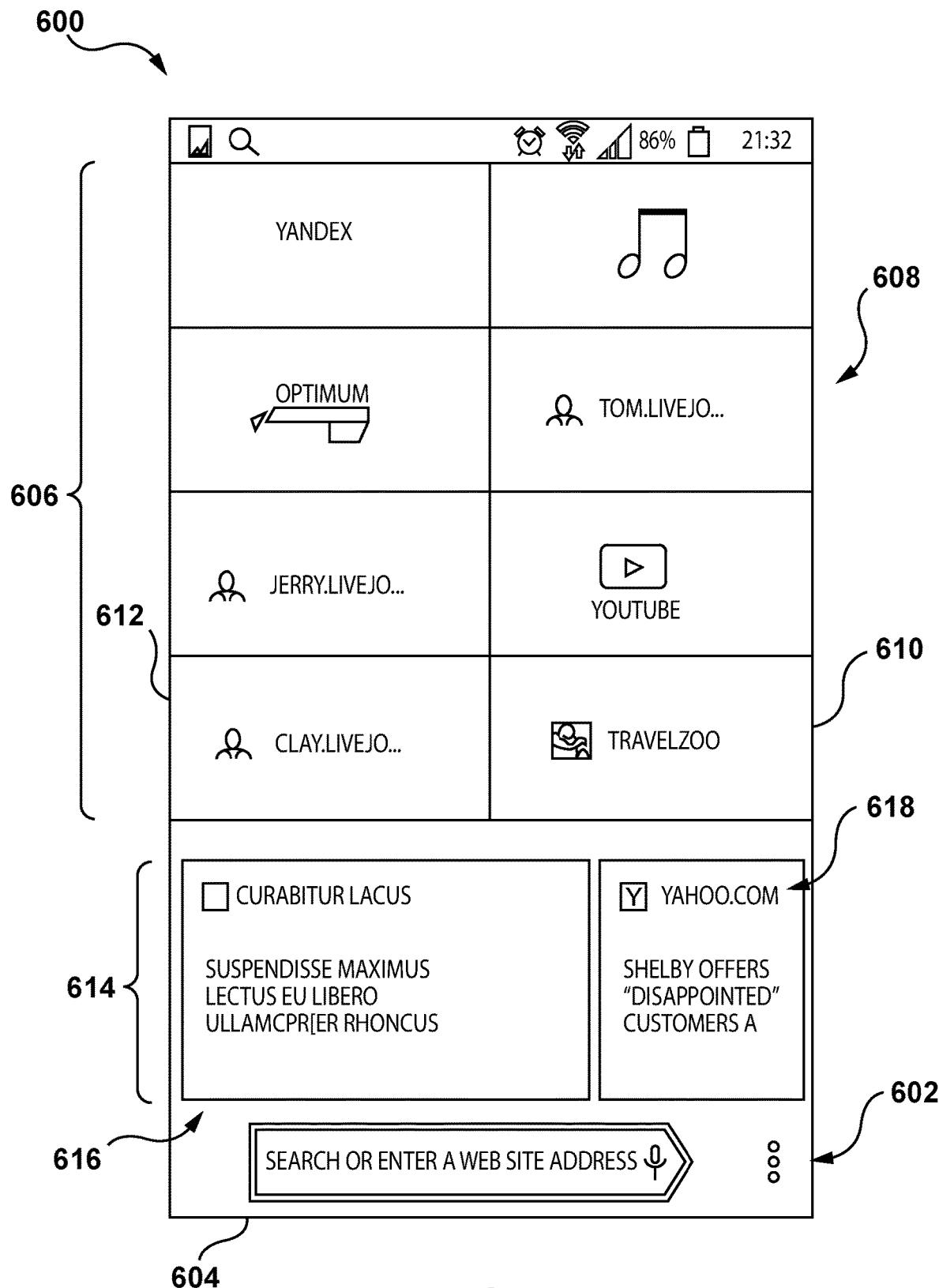
FIG. 6 depicts a screenshot of a recommendation interface of the system of FIG. 1.

With reference to FIG. 6, there is depicted a screenshot 600 of the recommendation interface implemented in accordance with a non-limiting embodiment of the present technology (the example of the recommendation interface being depicted as displayed on the screen of the electronic device 104 being implemented as a smart phone).

In some embodiments of the present technology the recommendation interface may be presented/displayed when the user 102 of the electronic device 104 actuates (i.e. executes, run, background-run or the like) the recommendation application 106.

Alternatively, the recommendation interface may be presented/displayed when the user 102 opens a new browser window and/or activates a new tab in the browser application. For example, in some embodiments of the present technology, the recommendation interface may act as a "home screen" in the browser application.

The recommendation interface includes a search interface 602. The search interface 602 includes a search query interface 604. The search query interface 604 may be implemented as an "omnibox" which allows entry of a search query for executing a search or a given network address (such as a Universal Remote Locator) for identifying a given network resource (such as a web site) to be accessed. However, the search query interface 804 may be configured to receive one or both of: entry of the search query for executing the search or a given network address (such as a Universal Remote Locator) for identifying a given network resource (such as a web site) to be accessed.

The recommendation interface further includes a links interface 606. The links interface 606 includes a plurality of tiles 608—of which eight are depicted in FIG. 6—only two of which are numbered in FIG. 6—a first tile 610 and a second tile 612.

Using the example of the first tile 610 and the second tile 612—each of the plurality of tiles 608 includes (or acts as) a link to either (i) a web site marked as "favorite" or otherwise marked by the user 102, (ii) a previously visited web site or (iii) the like. The plurality of tiles 608, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 608 may be different. As such, some or all of the plurality of tiles 208 may be implemented as differently shaped buttons, as hyperlinks presented in a list or the like.

As an example, the first tile 610 contains a link to a TRAVELZOO™ web site and the second tile 612 contains a link to a personal live journal web site. Needless to say, the number and content of the individual ones of the plurality of tiles 608 is not particularly limited.

For example, the number of the tiles within the plurality of tiles 608 may be pre-selected by the provider of the recommendation application 106. In some embodiments of the present technology, the number of tiles within the plurality of tiles 608 may be pre-selected based on the size and/or resolution of the screen of the electronic device 104 executing the recommendation application 106. For example, a first number of tiles may be pre-selected for the electronic device 104 executed as a smartphone, a second number of tiles may be pre-selected for the electronic device 104 executed as a tablet, and a third number of tiles may be pre-selected for the electronic device 104 executed as a laptop or desktop computer.

The recommendation interface further includes a recommended digital content set 614. The recommended digital content set 614 includes one or more recommended digital items, such as a first recommended digital item 616 and a second recommended digital item 618 (the second recommended digital item 618 only partially visible in FIG. 6). Naturally, the recommended digital content set 614 may have more recommended digital items. In the embodiment depicted in FIG. 6 and in those embodiments where more than one recommended digital items are present, the user 102 may scroll through the recommended digital content set 614. The scrolling may be achieved by any suitable means. For example, the user 102 can scroll the content of the recommended digital content set 614 by means of actuating a mouse device (not depicted), a key board key (not depicted) or interacting with a touch sensitive screen (not depicted) of or associated with the electronic device 104.

Example provided in FIG. 6 is just one possible implementation of the recommendation interface. Another example of the implementation of the recommendation interface, as well as an explanation of how the user 102 may interact with the recommendation interface 108 is disclosed in a co-owned Russian Patent Application entitled "A Computer-Implemented Method of Generating a Content Recommendation Interface", filed on May 12, 2016 and bearing an application number 2016118519; content of which is incorporated by reference herein in its entirety.

Returning to the description of FIG. 1, the electronic device 104 is configured to generate a request 150 for digital content recommendation. The request 150 may be generated in response to the user 102 providing an explicit indication of the user desire to receive a digital content recommendation. For example, the recommendation interface 108 may provide a button (or another actuatable element) to enable the user 102 to indicate her/his desire to receive a new or an updated digital content recommendation.

As an example, the recommendation interface may provide an actuatable button that reads "Request content recommendation". Within these embodiments, the request 150 for digital content recommendation can be thought of as "an explicit request" in a sense of the user 102 expressly providing a request for the digital content recommendation.

In other embodiments, the request 150 for digital content recommendation may be generated in response to the user 102 providing an implicit indication of the user desire to receive the digital content recommendation. In some embodiments of the present technology, the request 150 for digital content recommendation may be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO!™ browser or any other proprietary or commercially available browser application), the request 150 for digital content recommendation may be generated in response to the user 102 opening the browser application and may be generated, for example, without the user 102 executing any additional actions other than activating the browser application.

Optionally, the request 150 for digital content recommendation may be generated in response to the user 102 opening a new tab of the already-opened browser application and may be generated, for example, without the user 102 executing any additional actions other than activating the new browser tab.

Therefore, it is contemplated that in some embodiments of the present technology, the request 150 for digital content recommendation may be generated even without the user 102 knowing that the user 102 may be interested in obtaining a digital content recommendation.

Optionally, the request 150 for digital content recommendation may be generated in response to the user 102 selecting a particular element of the browser application and may be generated, for example, without the user 102 executing any additional actions other than selecting/activating the particular element of the browser application.

Examples of the particular element of the browser application include but are not limited to:

- an address line of the browser application bar;
- a search bar of the browser application and/or a search bar of a search engine web site accessed in the browser application;
- an omnibox (combined address and search bar of the browser application);
- a favorites or recently visited network resources pane; and
- any other pre-determined area of the browser application interface or a network resource displayed in the browser application.

How the content for the recommended digital content set 214 is generated and provided to the electronic device 104 will be described in greater detail herein further below.

Communication Network

The electronic device 104 is communicatively coupled to a communication network 110 for accessing a recommendation server 112 (or simply the server 112).

In some non-limiting embodiments of the present technology, the communication network 110 may be implemented as the Internet. In other embodiments of the present technology, the communication network 110 can be implemented differently, such as any wide-area communication network, local-area communication network, a private communication network and the like.

How a communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Plurality of Network Resources

Also coupled to the communication network 110 is a plurality of network resources 130 that includes a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. Respective digital content of the first network resource 132, the second network resource 134 and the plurality of additional network resources 136 is not particularly limited.

It is contemplated that any given one of the first network resource 132, the second network resource 134 and the plurality of additional network resources 136 may host (or in other words, host) digital items having potentially different types of digital content. As it will become apparent from the description herein further below, the plurality of network resources 136 may be hosting at least some of the potentially recommendable content items of the system 100.

For example, digital content of digital items may include but is not limited to: audio digital content for streaming or downloading, video digital content for streaming or downloading, news, blogs, information about various government institutions, information about points of interest, thematically clustered content (such as content relevant to those interested in kick-boxing), other multi-media digital content, and the like.

In another example, digital content of the digital items hosted by the first network resource 132, the second network resource 134 and the plurality of additional network resources 136 may be text-based. Text-based digital content may include but is not limited to: news, articles, blogs, information about various government institutions, information about points of interest, thematically clustered digital content (such as digital content relevant to those interested in kick-boxing), and the like. It is contemplated that in at least some embodiments of the present technology, "raw" textual data from text-based content items may be extracted by a server 112 and stored in a database 112 for further processing.

It should be noted, however, that "text-based" digital content does not intend to mean that the given digital item only contains text to the exclusion of other type of multi-media elements. On the contrary, the given text-based digital item may include text elements, as well as potentially other type of multi-media elements. For instance, a given text-based digital item that is an article may include text, as well as photos. As another example, a given text-based digital item that is a blog may include text, as well as embedded video elements.

It should be noted digital content items from a given network resource may be published by a publishing entity, or simply a "publisher". Generally speaking, a given publisher generates digital content and publishes it such that its digital content becomes available on a given network resource. It should be noted that a given publisher usually generates and publishes digital content having a common type and/or common topic. For example, a given publisher that usually publishes digital content related to sport news, is likely to publish new digital content also related to sport news.

Generally speaking, digital content items are potentially "discoverable" by the electronic device 104 via various means. For example, the user 102 of the electronic device 104 may use a browser application (not depicted) and enter a Universal Resource Locator (URL) associated with the given one of the first network resource 132, the second network resource 134 and the plurality of additional network resources 136. In another example, the user 102 of the electronic device 104 may execute a search using a search engine (not depicted) to discover digital content of one or more of the first network resource 132, the second network resource 134 and the plurality of additional network resources 136. As has been mentioned above, these are useful when the user 102 knows apriori which digital content the user 102 is interested in.

In at least some embodiments of the present technology, it is contemplated that the user 102 may appreciate one or more digital content items potentially recommendable by a recommendation system 180 hosted by the server 112. How the server 112 and the recommendation system 180 can be implemented in some embodiments of the present technology will now be described.

Recommendation Server

The server 112 may be implemented as a conventional computer server. In an example of an embodiment of the present technology, the server 112 may be implemented as a Dell™ PowerEdge™ Server running the Microsoft™ Windows Server™ operating system. Needless to say, the server 112 may be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 is configured to (i) receive the request 150 for digital content recommendation from the electronic device 104 and (ii) responsive to the request 150, generate a recommended digital content message 152 to be transmitted to the electronic device 104.

It is contemplated that at least some of digital content in the recommended digital content message 152 may be specifically generated or otherwise customized for the user 102 associated with the electronic device 104. As part of digital content in the recommended digital content message 152, the server 112 may be configured to provide inter alia information indicative of the recommended digital content set 814 to the electronic device 104 for display to the user 102 (on the recommendation interface of the recommendation application 106).

It should be understood that the recommended digital content set 814 provided to the user 102 by the server 112 may comprise given digital content that is available at one of the plurality of network resources 130, without the user 102 knowing the given digital content apriori. How the recommended digital content set 814 is generated by the server 112 will be described in greater detail further below.

As previously alluded to, the recommendation server 112 is configured to execute a plurality of the computer-implemented procedures that together are referred to herein as the "recommendation system" 180. In the context of the present technology, the server 112 providing recommendation services via the recommendation system 180 is configured to employ one or more Machine Learning Algorithms (MLAs) for supporting a variety of recommendation engine services. Notably, the recommendation system 180 one or more MLAs can be used by the server 112 in order to generate the recommended digital content set 814.

Generally speaking, MLAs are configured to "learn" from training samples and make predictions on new data. MLAs are usually used to first build a model based on training inputs of data in order to then make data-driven predictions or decisions expressed as outputs, rather than following static computer-readable instructions. For that resource, MLAs can be used as estimation models, ranking models, classification models and the like.

It should be understood that different types of the MLAs having different architectures and/or topologies may be used for implementing the MLA in some non-limiting embodiments of the present technology. Nevertheless, the implementation of a given MLA by the server 112 can be broadly categorized into two phases—a training phase and an in-use phase. First, the given MLA is trained in the training phase. Then, once the given MLA knows what data to expect as inputs and what data to provide as outputs, the MLA is run using in-use data in the in-use phase.

In at least some embodiments of the present technology, the server 112 may be configured to execute a Collaborative Filtering (CF) based model 160. Broadly speaking, CF based methods leverage historical interactions between users and digital content items for filtering out less desirable content when making recommendations to users. However, CF based methods typically suffer from limited performance when user-item interactions are very sparse, which is common for scenarios such as online shopping or any other recommendation platform having a very large potentially recommendable item set.

In some embodiments, the CF based model 160 may be implemented as a Singular Value Decomposition (SVD) model. Broadly speaking, a given SVD model is a machine learning model used to decompose "matrix-structure data" into its "constituent elements". For example, SVD models are used as machine learning tools for data reduction purposes, in least squares linear regression, image compression, and others. In some embodiments of the present technology, the CF model 160 may be implemented as a Neural Network (NN) trained to decompose matrix-structured data into one or more vectors.

It should be noted that the manner in which the CF model 160 can be implemented by the server 112 in some embodiments of the present technology is generally described in US patent publication number 2018/0075137, entitled "Method and Apparatus for Training a Machine Learning Algorithm (MLA) for Generating a Content Recommendation in a Recommendation System and Method and Apparatus for Generating the Recommended Content Using the MLA", published on May 15, 2018, and the content of which is incorporated herein by reference in its entirety and, therefore, will not be discussed in greater detail herein below.

In at least some embodiments of the present technology, the server 112 may be configured to execute a Decision Tree (DT) model 140. Broadly speaking, a given DT model is a machine learning algorithm having one or more "decision trees" that are used to go from observations about an object (represented in the branches) to conclusions about the object's target value (represented in the leaves). In one non-limiting implementation of the present technology, the DT model 140 can be trained using a "Gradient Boosting" (GB) technique and include "regression trees", in which a target variable can take continuous values (typically real numbers). In this non-limiting implementation, the DT model 140 is implemented as a "Gradient Boosted Regression Trees" (GBRT) model. In an other non-limiting implementation of the present technology, the DT model 140 can be implemented in accordance with the CatBoost framework.

Developers have designed a DT model 140 that comprises a plurality of "sub-models" respectively associated with a plurality of digital items available for recommendation in the recommendation system 180. In some embodiments, it can be said that the plurality of sub-models have "one-to-one relationships" with the digital items, such that a given sub-model from the plurality of sub-models is configured to generate scores for a corresponding, specific digital item from the plurality of digital items. For that reason, a given sub-model from the plurality of sub-models can be referred to as an "item-specific" (IS) DT model. In these embodiments, the DT model 140 can be said to contain a plurality of ISDT models configured to generate scores for respective, specific digital items from the plurality of digital items.

Figure 3:
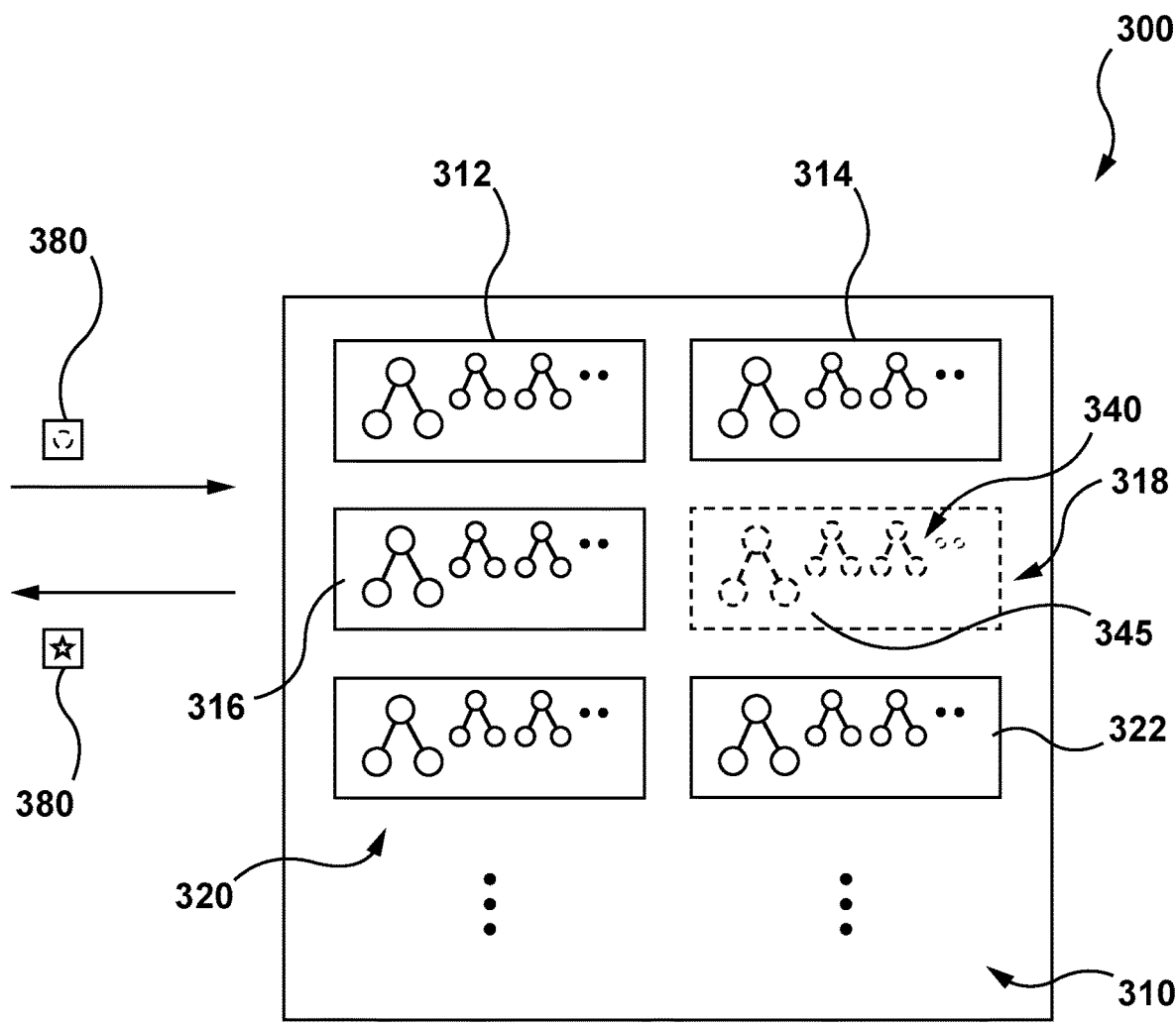
FIG. 3 depicts a machine learning model comprising a plurality of ISDT sub-models.

With reference to FIG. 3, there is depicted a machine learning model 300. In some embodiments, the DT model 140 may be implemented similarly to the machine learning model 300 comprising a plurality of independently trained ISDT models 310 (or "sub-models" of the model 300). Developers have realized that independent training of the plurality of ISDT model 310 allows for parallelization of the training process.

As illustrated, the plurality of ISDT models 310 comprises a first ISDT model 312, a second ISDT model 314, a third ISDT model 316, a fourth ISDT model 318, a fifth ISDT model 320, a sixth ISDT model 322, and so forth. Each one of the plurality of ISDT models 310 is trained independently from the rest of the plurality of ISDT models 310. How an ISDT models can be trained by the server 112 is described in greater details with reference to FIG. 2.

During in-use, however, the machine learning model 300 can receive data 380. The data 380 may be generated by the server 112 in response to receiving the request 150. For example, the data 380 can comprise user-item interaction data associated with the user 102, and an indication of one or more digital items to be potentially recommended to the user 102.

The server 112 may employ the indications of one or more digital items for identifying one or more corresponding ISDT models from the plurality of ISDT models 310. The server 112 may employ the user-item interaction data of the user 102 as input into the so-identified one or more corresponding ISDT models. The server 112 may receive from the machine learned model 300 data 390. The data 390 may comprise an indication of one or more scores for the one or more digital items which are generated by the one or more corresponding ISDT models. In some embodiments of the present technology, the one or more scores are indicative of a likelihood of the user 102 "interacting" with the one or more respective digital items. It is contemplated that the type of "interaction" the likelihood of which is to be predicted by a given ISDT model may depend on inter alia the type of user-item interaction data used during training and in-use phases.

The scores generated by the machine learned model 300 may be employed by the server 112 in a variety of manners. In some embodiments, the server 112 may be configured to rank a plurality of digital items based on the respective scores generated by the machine learned model 300.

In other embodiments, the server 112 may employ the CF model 140 for generating a preliminary set of digital items for recommendation to the user 102. For example, the server 112 may use the CF model 160 for selecting a subset of digital items from the pool of potentially recommendable items of the recommendation system 180. The server 112 may then employ the machine learned model 300 for generating respective scores for the subset of digital items. The server 112 may then rank the subset of digital items based on the respective scores. In one example, top N digital items from the so-ranked subset of digital items may be transmitted to the electronic device 106 as content recommendation.

In further embodiments, the server 112 may use scores generated by the machine learned model 300 as one of a plurality of inputs associated with respective digital items to an other machine learning algorithm for generating content recommendation. In other words, it can be said that the scores generated by the machine learned model 300 may be used as "features" for respective digital items when generating content recommendation for the user 102.

Database

The server 112 is communicatively coupled to a database 120. The database 120 is depicted as a separate entity from the server 112. However, it is contemplated that the database 120 may be implemented integrally with the server 112, without departing from the scope of the present technology. Alternatively, functionalities of the database 120 as described below may be distributed between more than one physical devices.

Generally speaking, the database 120 is configured to store data generated, retrieved and/or processed by the server 112 for temporary and/or permanent storage thereof. For example, the database 120 may be configured to store inter alia data for training and using one or more MLAs of the recommendation system 180.

The database 120 stored information associated with respective items of the recommendation system 180, hereinafter referred to as item data 202. The item data 202 includes information about respective digital content discovered and catalogued by the server 112. For example, the item data 202 may include the digital content of respective digital content items that are potentially recommendable by the recommendation system 180.

The nature of digital content that is potentially recommendable by the server 112 is not particularly limited. Some examples of digital content that is potentially recommendable by the server 112 include, but are not limited to, digital items such as:

- a news article;
- a publication;
- a web page;
- a post on a social media web site;
- a new application to be downloaded from an app store;
- a new song (music track) to play/download from a given network resource;
- an audiobook to play/download from a given network resource;
- a podcast to play/download from a given network resource;
- a new movie (video clip) to play/download from a given network resource;
- a product to be bought from a given network resource; and
- a new digital item uploaded for viewing on a social media web site (such as a new photo uploaded to an INSTRAGRAM™ or FACEBOOK™ account).

In some non-limiting embodiments of the present technology, the item data 202 may comprise raw textual data from respective digital content items. This means that the server 112 may be configured to parse a given digital content item, extract (raw) textual content from that item and store it in association with that item as part of the item data 202.

In other non-limiting embodiments, the item data 202 may comprise information about one or more item features associated with respective digital content items. For example, the database 120 may store data associated with respective items indicative of, but not limited to:
- popularity of a given item;
- click-through-rate for the given item;
- time-per-click associated with the given item;
- other statistical data associated with the given item; and others.

In additional embodiments of the present technology, the database 120 may be populated with additional information about the plurality of users of the recommendation service, hereinafter referred to as user data. For example, the server 112 may be configured to collect and store in the database 120 user-profile data associated with respective users of the recommendation system 180 such as, but not limited to: name, age, gender, user-selected types of digital content that (s)he desires, and the like. Other information about the plurality of users of the recommendation service may also be stored in the user database 120 as part of the user data, without departing from the scope of the present technology.

In some embodiments of the present technology, the database 120 may also be configured to store information about interactions between digital content items and users, referred to as user-item interaction data. For example, the server 112 may track and gather a variety of different user-item interactions between users and previously recommended items.

For example, let it be assumed that a given user interacted with a given digital content item being a given digital item previously recommended thereto via the recommendation service. As such, the server 112 may track and gather user-item interaction data of the given user with the given digital item in a form of user events that occurred between the given user and the given digital item. Examples of different types of user events that may be tracked and gathered by the server 112 may include, but are not limited to:
- the given user "scrolled over" the given digital item;
- the given user "liked" the given digital item;
- the given user "disliked" the given digital item;
- the given user "shared" the given digital item;
- the given user "clicked" or "selected" the given digital item;
- the given user "played" or "listened" the given digital item;
- the given user spent an amount of "interaction time" consulting the given digital item; and
- the given user purchased/ordered/downloaded the given digital item.

Figure 2:
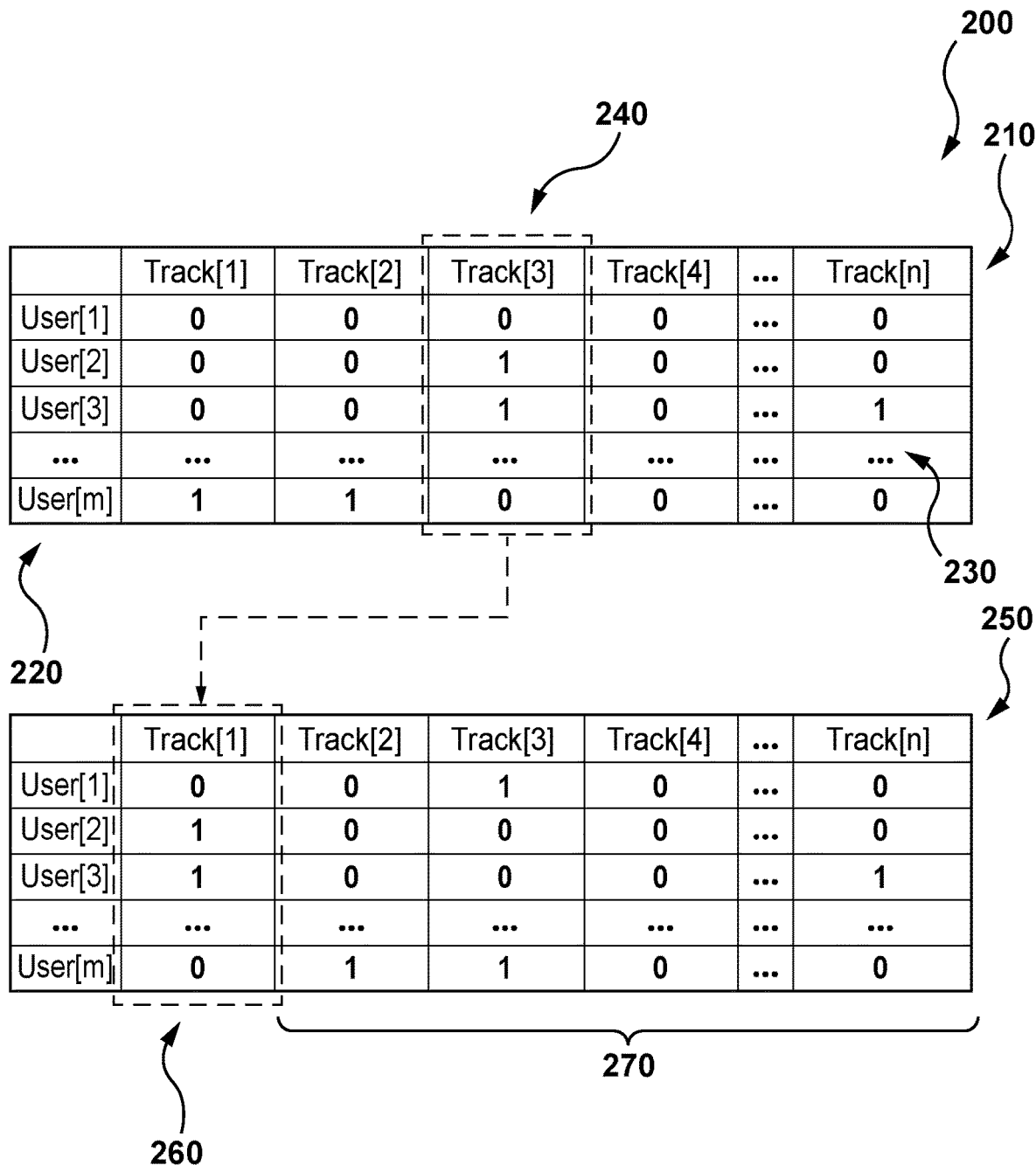
FIG. 2 depicts a process for generating a user-item interaction matrix and a training set for a given item-specific decision-tree (ISDT) model.

In some embodiments of the present technology, the server 112 may be configured to use the user-item interaction data for training ISDT models. With reference to FIG. 2, there is depicted the user-item interaction matrix 200. The server 112 may be configured to generate the training set 250 for a given ISDT model from the plurality of ISDT model 310.

As explained above, the training set 250 comprises the training target set 260, and the training input set 270. For this ISDT model, user-item interaction data 240 for the third digital item is used for generating the training target set 260. The user-item interaction data 240 is indicative of user-item interactions between the plurality of users 220 and the third digital item. For this ISDT model, the rest of the user-item interaction data 230 (all except the user-item interaction data 240) is used for generation the training input set 270. The user-item interaction data 240 is indicative of user-item interactions between the plurality of users 220 and a subset of digital items. In this non-limiting implementation, the subset of digital items includes all digital items from the plurality of digital items 210, except for the third digital item.

Developers of the present technology have realized that the subset of digital items can be used as "training features" for training an ISDT model, user-item interaction data between the subset of digital items and the plurality of users can be used as "training input values" for the training features, and user-item interaction data between the third digital item and the plurality of users can be used as "training target values" for the training features. In this non-limiting implementation, a number of training features in the training input set 270 is equal to a number of digital items in the subset of digital items (number of digital items in the plurality of digital items 210 minus one).

It is contemplated that the training set 250 may be used to train a GBDT model. In one implementation, the training set 250 can be used to train a GBRT model, and standard error can be used as a loss. A first DT can thus be generated and has feature nodes and leaf nodes. The feature nodes of the DT represent the respective training features of the training set 250 (i.e., respective ones from the subset of digital items), and average values of the error gradient can be located in the leaf nodes of the DT. After so-generating the first DT, the gradient can be updated and the process continues with generation of a next DT of the ISDT model, and so forth. As a result, a plurality of DTs forming the ISDT model are generated.

In this non-limiting implementation, during in-use, this ISDT model can receive as input a list of digital items liked by a current user, and can return as output an estimate of the probability that this user will also like the third digital item. It is contemplated, that the user-item interaction matrix 200 may be used for generating a large number of ISDT models. In this non-limiting implementation, the user-item interaction matrix 200 may be used to generate a number of ISDT models that is equal to a number of digital items in the plurality of digital items 210.

Similarly to what has been described above with respect to the ISDT model for the third digital item, an other training set may be generated for an other digital item where user-interaction data for that other digital item is used as an other training target set, and an other subset of digital items (excluding the other digital item) are used as other training features. Put another way, the training set generation process can be repeated by selecting different columns of the user-item interaction matrix 200, thereby selecting corresponding digital items as respective target digital items for respective ISDT models and train them independently on the respective sets of digital items (excluding respective target digital items).

Figure 4:
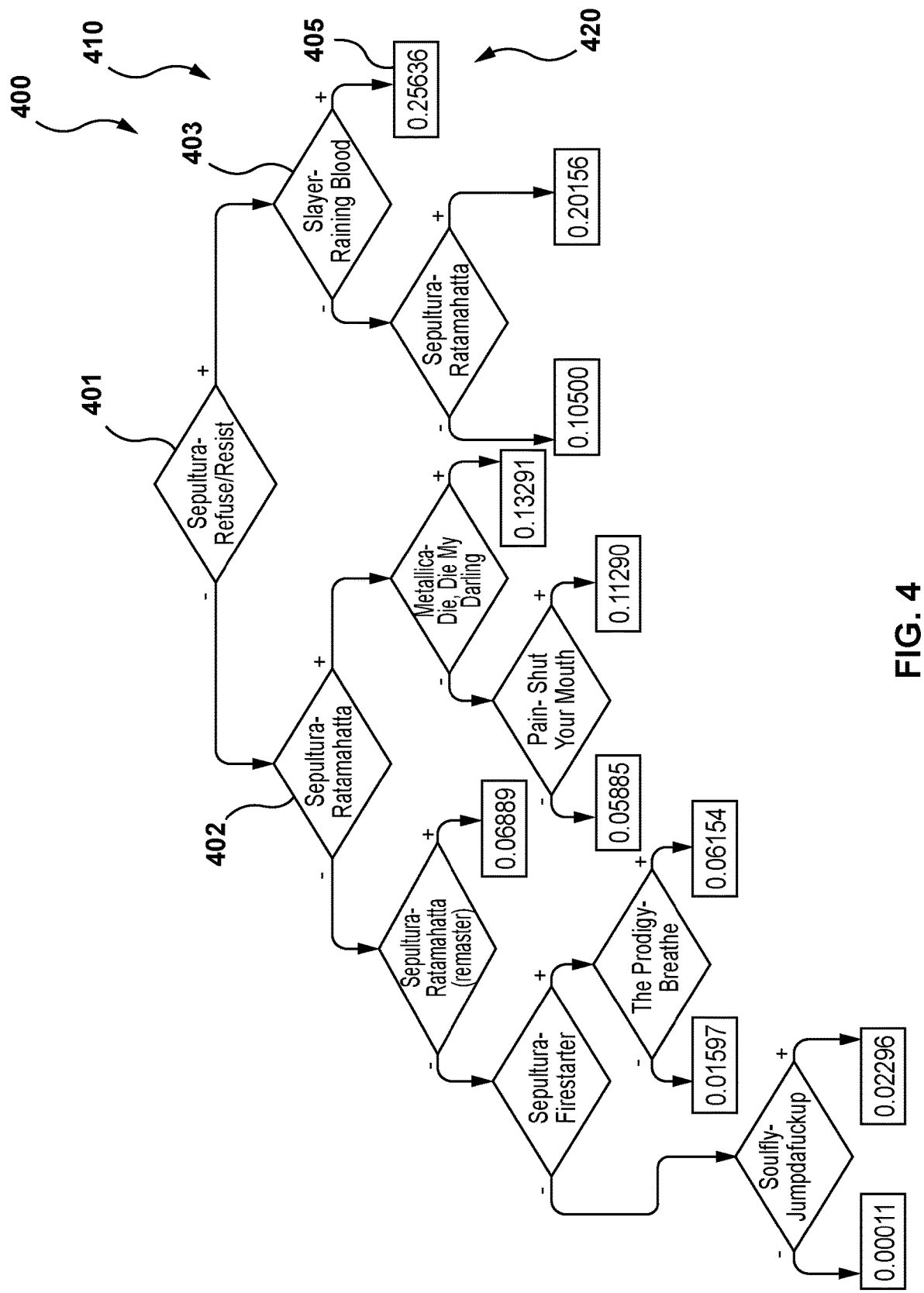
FIG. 4 depicts a first DT from a first ISDT sub-model from the plurality of ISDT sub-models of FIG. 3.

With reference to FIG. 4, there is depicted a representation 400 of an ISDT 345. For example, the ISDT 345 may be a given ISDT from the plurality of ISDTs forming the ISDT model 318. Let it be assumed that the ISDT model 318 is generated for a music track digital item "Voodoo Child" by Jimi Hendrix.

The ISDT 345 has a plurality of feature nodes 450 and a plurality of leaf nodes 460. Each of the plurality of feature nodes is associated with a respective digital item. For example, a first feature node 401 (also referred to as a "root node" of the ISDT 345) is associated with the music track digital item "Refuse/Resist" by Sepultura. In this example, a second feature node 402 and a third feature node 403 (also referred to as "first level nodes" of the ISDT 345) are associated respectively with the music track digital items "Ratamahatta" by Sepultura, and "Raining Blood" by Slayer. Similarly, other feature nodes of the ISDT 345 are associated with respective music track digital items, except for the music track digital item for which the ISDT 345 is generated (that is, "Voodoo Child" by Jimi Hendrix).

Let it be assumed that during in-use, the server 112 employs the machine learned model 300 to generate a score for the music track digital item "Voodoo Child" by Jimi Hendrix. The server 112 may provide user-item interaction data associated with the user 102 to the machine learned model 300 and an indication of the music track digital item "Voodoo Child" by Jimi Hendrix. The server 112 identifies the ISDT model 318 associated with the music track digital item "Voodoo Child" by Jimi Hendrix. The server 112 employed the plurality of ISDTs forming the ISDT model 318 for generating the score. How the ISDT 345 is used in this example will now be described.

The server 112 is configured to use the ISDT 345 for generating the score for the music track digital item "Voodoo Child" by Jimi Hendrix. At the root node 401, user-item interaction data of the user 102 is used to determine whether the user 102 previously interacted with the music track digital item "Refuse/Resist" by Sepultura. The process then continues to a given first level node.

Let it be assumed that the user 102 did previously interact with the music track digital item "Refuse/Resist" by Sepultura. In this case, the process continues to the third feature node 403 associated with the music track digital item "Raining Blood" by Slayer. At the third feature node 403, user-item interaction data of the user 102 is used to determine whether the user 102 previously interacted with the music track digital item "Raining Blood" by Slayer. Let it be assumed that the user 102 did previously interact with the music track digital item "Raining Blood" by Slayer. As a result, the process ends in a leaf node 405 associated with a value of 0.25636.

Similarly to what has been described with reference to the ISDT 345, the server 112 uses the plurality of ISDTs forming the ISDT model 318 for generating respective output values. The server 112 is then configured to generate a score for the music track digital item "Voodoo Child" by Jimi Hendrix based on a combination of output values (including the output value 0.25636 of the ISDT 345) from the plurality of ISDTs forming the ISDT model 318. It should be noted that the specific manner of how the output values are combined for generating the score may depend on inter alia a specific DT training technique and specific implementations of the present technology.

Figure 5:
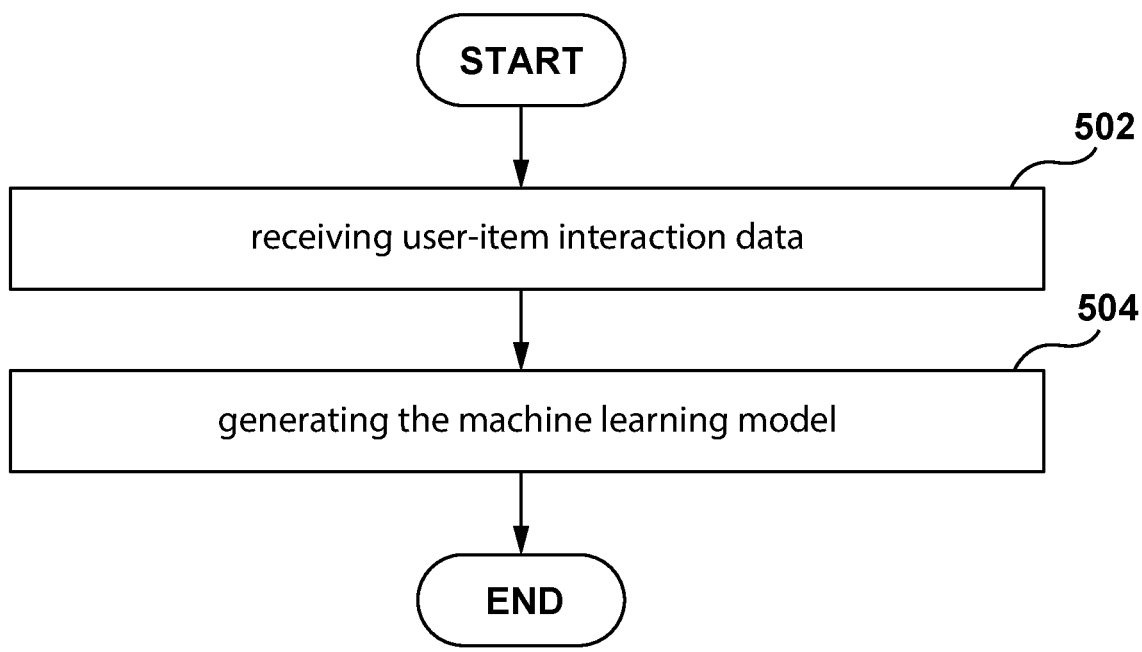
FIG. 5 depicts a block diagram of a method of generating the machine learning algorithm of FIG. 3, the method executable by a server of FIG. 1, in accordance with embodiments of the present technology.

In some embodiments of the present technology, the server 112 is configured to execute a method 500 depicted in FIG. 5. Various steps of the method 500 will now be described.

Step 502: Receiving User-Item Interaction Data

The method 500 begins at step 502 with the server 112 configured to receive user-item interaction data indicative of previous interactions between a plurality of users and a plurality of digital items available for recommendation to the plurality of users within the recommendation system 180.

For example, the server 112 may receive the user-item interaction data from the database 120. As mentioned above, the database 120 may be used to store user-item interaction data on the recommendation system 180. In some embodiments, the plurality of digital items may include music digital items. In other embodiments, the plurality of digital items may include video digital items. In further embodiments, the plurality of digital items may include a different types of digital items such as music, video, news, articles, etc.

In one implementation of the present technology, with reference to FIG. 2, the server 112 may receive the user-item interaction data in the user-item interaction matrix 200. The dimension of the user-item interaction matrix 200 is equal to a number of users in the plurality of users 220 per a number of digital items in the plurality of digital items 210.

In this non-limiting implementation, the digital items are songs/music, or "tracks", that are recommendable by a given music recommendation system. The user-item interaction matrix 200 includes information indicative of user-item interactions 230 for respective user-item pairs. In this non-limiting implementation, the user-item interactions 230 are indicative of "likes" (with a value of "1") of users of respective user-item pairs, or an absence thereof for a respective user-item pair (with a value of "0").

Step 504: Generating the Machine Learning Model

The method 500 continues to step 504 with the server 112 configured to generate, based on the user-item interaction data, the machine learning algorithm 300 for predicting scores indicative of a likelihood that a given user of the plurality of users will interact with a given digital item of the plurality of digital items.

The machine learning model 300 includes the plurality of ISDT models 310. A given ISDT sub-model of the plurality of ISDT sub-models 310 is associated with the given digital item for generating a score indicative of the likelihood that the given user will interact with the given digital item.

During the training process of the ISDT model, data from the user-interaction matrix 200 is used for generating a training set 250 for that given ISDT model. In this non-limiting implementation, the training set 250 is being generated for a third digital item "Track[3]" from the plurality of digital items 210.

The training set 250 comprises a training target set 260, and a training input set 270. For this ISDT model, user-item interaction data 240 for the third digital item is used for generating the training target set 260. The user-item interaction data 240 is indicative of user-item interactions between the plurality of users 220 and the third digital item. For this ISDT model, the remainder of the user-item interaction data 230 (all except the user-item interaction data 240) is used for generation the training input set 270. The user-item interaction data 230 except the user-item interaction data 240 is indicative of user-item interactions between the plurality of users 220 and a subset of digital items. In this non-limiting implementation, the subset of digital items includes all digital items from the plurality of digital items 210, except for the third digital item.

Developers of the present technology have realized that the subset of digital items can be used as "training features" for training an ISDT model, user-item interaction data between the subset of digital items and the plurality of users can be used as "training input values" for the training features, and user-item interaction data between the third digital item and the plurality of users can be used as "training target values" for the training features. In this non-limiting implementation, a number of training features in the training input set 270 can be equal to a number of digital items in the subset of digital items (number of digital items in the plurality of digital items 210 minus one).

It is contemplated that the training set 250 may be used to train a GBDT model. In one implementation, the training set 250 can be used to train a GBRT model, and standard error can be used as a loss. A first DT can thus be generated and has feature nodes and leaf nodes. The feature nodes of the DT represent the respective training features of the training set 250 (i.e., respective ones from the subset of digital items), and average values of the error gradient can be located in the leaf nodes of the DT. After so-generating the first DT, the gradient can be updated and the process continues with generation of a next DT of the ISDT model, and so forth. As a result, a plurality of DTs forming the ISDT model are generated.

It can be said that in some embodiments, the server 112 may be configured to a training set for a given ISDT sub-model including: (i) a training target set for the given digital item containing the user-item interaction data associated with the given digital item, and (ii) a training input set for the given digital item containing the user-item interaction data associated with a subset of digital items of the plurality of digital items. The subset of digital items excluding the given digital item for which the given ISDT sub-model is being trained. The subset of digital items are used as training features for generating the given ISDT sub-model such that previous user-item interactions between the plurality of users and the subset of digital items are used as values for respective training features.

It can also be said that the given ISDT sub-model is formed by a plurality of DTs generated by the server 112 based on the training set and using a GB technique. A given one from the given plurality of DTs has feature nodes and leaf nodes, and the feature nodes correspond to the respective training features and the leaf nodes associated with output values of the given one from the given plurality of DTs.

In this non-limiting implementation, during in-use, this ISDT model can receive as input a list of digital items liked by a current user, and can return as output an estimate of the probability that this user will also like the third digital item.

It is contemplated, that the user-item interaction matrix 200 may be used for generating a large number of ISDT models. In this non-limiting implementation, the user-item interaction matrix 200 may be used to generate a number of ISDT models that is equal to a number of digital items in the plurality of digital items 210.

Similarly to what has been described above with respect to the ISDT model for the third digital item, an other training set may be generated for an other digital item where user-interaction data for that other digital item is used as an other training target set, and an other subset of digital items (excluding the other digital item) are used as other training features. Put another way, the training set generation process can be repeated by selecting different columns of the user-item interaction matrix 200, thereby selecting corresponding digital items as respective target digital items for respective ISDT models and train them independently on the respective sets of digital items (excluding respective target digital items).

In some embodiments, the server 112 may be configured to receive the request 150 for content recommendation from the electronic device 104 associated with the user 102 of the recommendation system 180. The server 112 may generate, employing the CF model 160 for example, a preliminary set of digital items from the plurality of digital items to be potentially recommended to the user 102. The server 112 may use the machine learning model 300 to generate scores for respective ones from the preliminary set of digital items.

The server 112 may use the scores to rank the respective ones from the preliminary set of digital items. The ranked preliminary set of digital items may be used for generating the content recommendation for the user 102. For example, top N ranked digital items from the ranked preliminary set of digital items may be selected to be part of the content recommendation. The server 112 may transmit the response 180 for content recommendation to the electronic device 104 including at least one amongst the ranked preliminary set of digital items.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature-based, or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating a machine learning model, the machine learning model to be used for generating a digital item recommendation to a user of a recommendation system, the user being one of a plurality of users, the recommendation system being executed by a server, the user being associated with an electronic device, the electronic device being communicatively connectable with the server over a communication network, the method executable by the server, the method comprising:

receiving user-item interaction data indicative of previous interactions between the plurality of users and a plurality of digital items available for recommendation to the plurality of users within the recommendation system;

generating based on the user-item interaction data, the machine learning model for predicting scores indicative of a likelihood that a given user of the plurality of users will interact with a given digital item of the plurality of digital items, the machine learning model including a plurality of item-specific decision-tree (ISDT) sub-models, a given ISDT sub-model of the plurality of ISDT sub-models being associated with the given digital item for generating a score indicative of the likelihood that the given user will interact with the given digital item;

the generating including generating for the given ISDT sub-model a training set including:

a training target set for the given digital item containing the user-item interaction data associated with the given digital item;

a training input set for the given digital item containing the user-item interaction data associated with a subset of digital items of the plurality of digital items, the subset of digital items excluding the given digital item,
the subset of digital items to be used as training features for generating the given ISDT sub-model such that previous user-item interactions between the plurality of users and the subset of digital items are used as values for respective training features;
the generating including generating, a given plurality of decision trees (DTs) using the training set, the given plurality of DTs forming the given ISDT sub-model,
a given one from the given plurality of DTs having feature nodes and leaf nodes, each of the feature nodes corresponding to a digital item of the subset of digital items, and each of the leaf nodes comprising a score indicative of the likelihood that the given user will interact with the given digital item.

2. The method of claim 1, wherein the generating the machine learning model further includes:
generating for a second ISDT sub-model a second training set including:
a second training target set for a second digital item from the plurality of digital items containing the user-item interaction data associated with the second digital item;
a second training input set for the second digital item containing the user-item interaction data associated with a second subset of digital items of the plurality of digital items, the subset of digital items excluding the second digital item and including the given digital item,
the second subset of digital items to be used as second training features for generating the second ISDT sub-model such that previous user-item interactions between the plurality of users and the second subset of digital items are used as values for respective second training features;
generating a second plurality of decision trees (DTs) using the second training set, the second plurality of DTs forming the second ISDT sub-model,
a given one from the second plurality of DTs having second feature nodes and second leaf nodes, the second feature nodes corresponding to the respective second training features and the second leaf nodes associated with output values of the given one from the second plurality of DTs.

3. The method of claim 2, wherein the method further comprises:
receiving a request for content recommendation from the electronic device associated with the user of the recommendation system;
generating, by employing another machine learning algorithm, a preliminary set of digital items from the plurality of digital items to be potentially recommended to the user, the preliminary set of digital items including the given digital item and the second digital item;
generating, by employing the machine learning algorithm, the score for the given digital item using the given ISDT sub-model and a second score for the second digital item using the second ISDT sub-model;
ranking the given digital item and the second digital item amongst the preliminary set of digital items using the score and the second score; and
transmitting a response for content recommendation to the electronic device including at least one amongst the given digital item and the second digital item.

4. The method of claim 1, wherein the plurality of digital items include music digital items.

5. The method of claim 1, wherein the plurality digital items include video digital items.

6. The method of claim 1, wherein the subset of digital items includes all digital items from the plurality of digital items except the given digital item.

7. A method of generating an item-specific decision-tree (ISDT) model, the ISDT model being associated with a given digital item from a plurality of digital items available for recommendation to a plurality of users within a recommendation system, the ISDT model for generating a score indicative of the likelihood that a given user from the plurality of users will interact with the given digital item, the recommendation system executed by a server, the method executable by the server, the method comprising:
receiving user-item interaction data indicative of previous interactions between the plurality of users and the plurality of digital items;
generating a training set including:
a training target set for the given digital item containing the user-item interaction data associated with the given digital item;
a training input set for the given digital item containing the user-item interaction data associated with a subset of digital items of the plurality of digital items, the subset of digital items excluding the given digital item,
the subset of digital items to be used as training features for generating the ISDT model such that previous user-item interactions between the plurality of users and the subset of digital items are used as values for respective training features;
generating a plurality of decision trees (DTs) using the training set, the plurality of DTs forming the ISDT model,
a given one from the plurality of DTs having feature nodes and leaf nodes, each of the feature nodes corresponding to a digital item of the subset of digital items, and each of the leaf nodes comprising a score indicative of the likelihood that the given user will interact with the given digital item.

8. The method of claim 7, wherein the generating the plurality of DTs includes executing a Gradient Boosting (GB) algorithm.

9. The method of claim 7, wherein the plurality of digital items includes at least one of music digital items and video digital items.

10. A method of generating a digital item recommendation to a user of a recommendation system, the recommendation system being executed by a server, the user being associated with an electronic device, the electronic device being communicatively connectable with the server over a communication network, the method executable by the server, the method comprising:
receiving a request for content recommendation from the electronic device, the user being associated with user-item interaction data indicative of previous user-item interactions between the user and a plurality of digital items available for recommendation in the recommendation system;
generating, by executing an item-specific decision-tree (ISDT) model, a score for a user-item pair including the user and a given digital item, the ISDT model being associated with the given digital item, the score being indicative of the likelihood that the user will interact with the given digital item, the ISDT model including a plurality of decision-trees (DTs), a given one from the plurality of DTs having feature nodes and leaf nodes, each of the feature nodes corresponding to a digital item of a subset of digital items from the plurality of digital items, the subset of digital items excluding the given digital item, and each of the leaf nodes comprising an output value indicative of the likelihood that the user will interact with the given digital item, the generating including:
- generating in-use output values by respective ones from the plurality of DTs using previous user-item interactions between the user and the subset of digital items as values for the respective features,
- generating the score by combining the in-use output values;

ranking the given digital item amongst the plurality of digital items using the score; and transmitting a response for content recommendation to the electronic device including the given digital item.

* * * * *